(No Model.)
W. W. BOOTH.
LINING FOR SAFES.
No. 396,680. Patented Jan. 22, 1889.
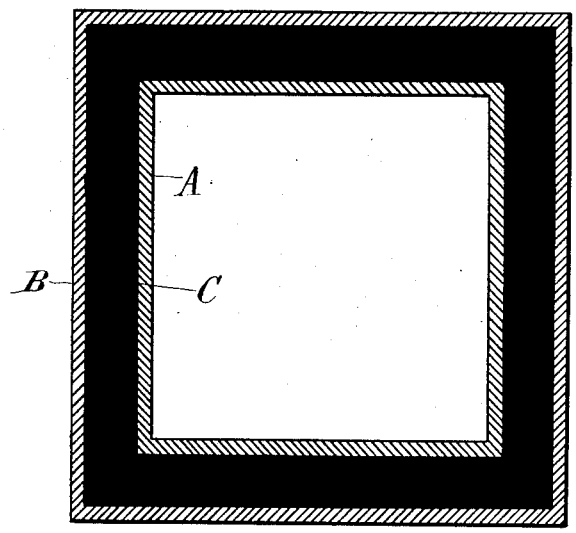
Witnesses:
Inventor.
Walter W. Booth,
By R. G. Dyrenforth,
his attorney.

UNITED STATES PATENT OFFICE.

WALTER WILSON BOOTH, OF ELMSFORD, ASSIGNOR TO HIMSELF, AND CHARLES FRANCIS STONE, OF NEW YORK, N. Y.

LINING FOR SAFFS.

SPECIFICATION forming part of Letters Patent No. 396,680, dated January 22, 1889.

Application filed December 27, 1888. Serial No. 191,202. (No model.)

*To all whom it may concern:*

Be it known that I, WALTER WILSON BOOTH, a citizen of the United States, residing at Elmsford, county of Westchester, and State of New York, have invented certain new and useful Improvements in the Manufacture of Fire and Burglar Proof Safes; and I do hereby declare that the following is a full, clear, and exact description of my invention, which will enable others skilled in the art to which it appertains to make and use the same.

This invention relates to safe-linings.

The object of the invention is to produce a safe by which its contents will be protected from injury by heat in case of fire and also to the highest degree possible from access by boring or drilling.

With these objects in view the invention resides, essentially, in a safe made with an inner and an outer shell of metal and a lining or filling interposed between the parts of the shell, the said lining being composed of a composition of aluminous clay and feldspar, or their equivalent, fused together.

I have illustrated the invention in the accompanying drawing, in which the figure represents a sectional view of a safe, showing the inner and outer shells with my lining interposed between the two.

In the drawing, A represents the inner shell, B representing the outer shell, and C the lining.

The method employed in the mixing and preparing of the compounds forming my improved lining is the same as that employed in the preparation of clays in the manufacture of pottery and porcelain ware, and is well known and unnecessary for me to describe it at length.

Any one of the following compounds may be used—viz., kaolin and feldspar, kaolin and silica, feldspar and aluminous clay, feldspar and silica, or aluminous clay and silica. The proportions used in the combination of these substances may be varied, but the employment of some two of them is necessary to give the compound, first, sufficient fusibility in manufacturing, and afterward sufficient hardness to render it in the first place infusible at any degree of heat to which a safe may be subjected, and at the same time capable to resist the attack of steel or other tools. It will be found in some instances, and with some of the differing varieties of these substances, that the addition of a third and even of a fourth substance will improve the working of the mixture during manufacture and the hardness after manufacture.

Any combination of the above-mentioned substances may be used in varying proportions and with satisfactory results; but I prefer a mixture of aluminous clay and feldspar and one of the processes of preparation and manufacture, and the method which I prefer to employ is as follows: Sufficient feldspar is ground to a very fine dust and is afterward mixed with an equal quantity, by measure, of aluminous clay, and then with sufficient water to make the mass of the consistency of cream. The mixture is then passed through sieves of the kind commonly employed in the sieving of clay for potting. The mixture is then allowed to settle, and sufficient of the water which arises to the surface is drained off until the mixture is sufficiently thick to allow of its being molded. The mixture is now shaped, by means of molds such as are used in potting, into the required form, and the forms are then placed in a suitable kiln—such as is used in potting—and are fired or baked until the mass of the compound has been sufficiently fused, when the kiln is allowed to cool off and the forms are withdrawn. These forms may now be broken or crushed into small pieces and used in this way for filling the space between the outer and inner shells of the ordinary fire and burglar proof safe. I would prefer, however, that before baking or firing in the kiln the mixture be molded into the shape necessary to completely occupy the area of the space between the outer and inner shells of the safe; but should this for any reason be inconvenient it may, as I have stated, be made into any form and be afterward broken up into small pieces and used as other substances are now used for filling. When used in this way, broken pieces of pottery and the chips and waste of pottery manufacturers may be employed.

Compounds of any two or more of the before-mentioned substances are infusible, except at extreme degrees of heat, and after baking or firing are so hard as to resist the attack of all known forms of tools. These compounds are at the same time non-conductors of heat, and for that reason are valuable for use in the manufacture of safes to protect the contents from injury by fire.

To further prevent the action of great heat upon the interior of the safe, there may be used in connection with either of these compounds above mentioned alum or any other infusible and non-conducting substance. These non-conductors may be either mixed with the compound after it has been fired and broken into bits and be used at the same time with it in filling the safe or the whole of the area of the interior, but only a portion of the thickness of the space to be filled may be occupied by the compound in one piece or in small pieces, and the remainder unoccupied may be then filled with the alum or some other non-conducting and infusible substance.

Having thus fully described my invention, what I claim as new, and desire to secure by Letters Patent, is—

In a safe having inner and outer shells, the lining consisting of aluminous clay and feldspar fused together, substantially as described.

WALTER WILSON BOOTH.

Witnesses:
ROCKWELL KENT,
DANL. RUMBOLD.